United States Patent
Pi et al.

(10) Patent No.: US 11,756,270 B2
(45) Date of Patent: Sep. 12, 2023

(54) SLAM-BASED ELECTRONIC DEVICE AND AN OPERATING METHOD THEREOF

(71) Applicant: SAMSUNG ELECTRONICS CO., LTD., Suwon-si (KR)

(72) Inventors: Jaehwan Pi, Seoul (KR); Yuntae Kim, Suwon-si (KR); Donghoon Sagong, Suwon-si (KR); Hojin Ju, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 44 days.

(21) Appl. No.: 17/581,310

(22) Filed: Jan. 21, 2022

(65) Prior Publication Data

US 2023/0038594 A1 Feb. 9, 2023

(30) Foreign Application Priority Data

Jul. 20, 2021 (KR) .................. 10-2021-0094921

(51) Int. Cl.
*G06T 19/00* (2011.01)
*G06T 7/73* (2017.01)
*G06V 10/40* (2022.01)

(52) U.S. Cl.
CPC .............. *G06T 19/006* (2013.01); *G06T 7/73* (2017.01); *G06V 10/40* (2022.01)

(58) Field of Classification Search
None
See application file for complete search history.

(56) References Cited

U.S. PATENT DOCUMENTS

| 2018/0341022 A1* | 11/2018 | Guo | G06F 18/21 |
| 2020/0268348 A1* | 8/2020 | Park | A61B 8/5261 |
| 2020/0333162 A1* | 10/2020 | Wang | G01C 21/383 |

* cited by examiner

*Primary Examiner* — Tapas Mazumder
(74) *Attorney, Agent, or Firm* — Sughrue Mion, PLLC

(57) ABSTRACT

A simultaneous localization and mapping-based electronic device includes: a data acquisition device configured to acquire external data; a memory; and a processor configured to be operatively connected to the data acquisition device and the memory, wherein the processor is further configured to extract features of surrounding objects from the acquired external data, calculate a score of a registration error of the extracted features when the number of the extracted features is greater than a set number stored in the memory, and select the set number of features from the among the extracted features, based on the calculated score.

20 Claims, 15 Drawing Sheets

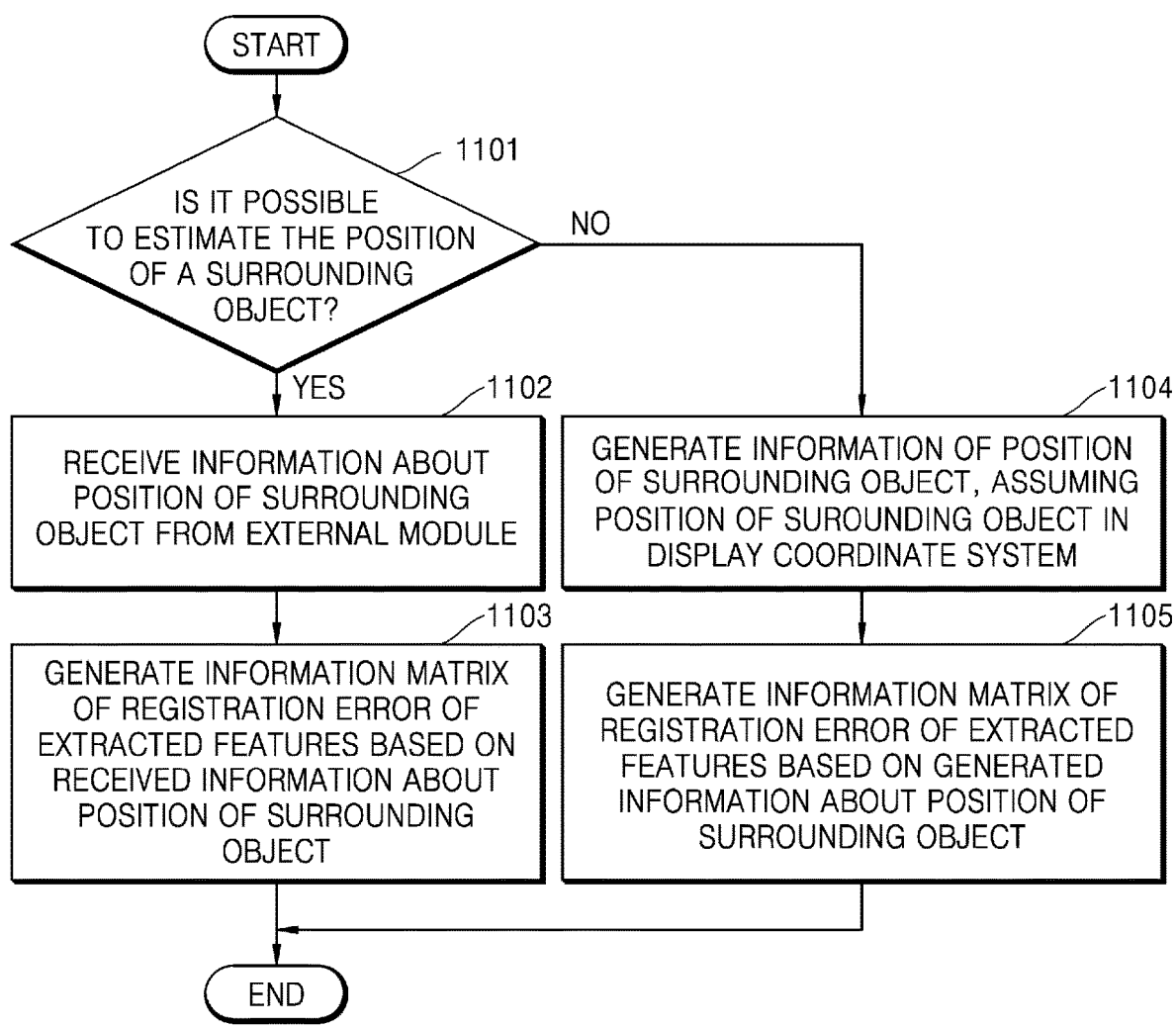

SLAM-BASED ELECTRONIC DEVICE AND AN OPERATING METHOD THEREOF

CROSS-REFERENCE TO RELATED APPLICATION

This application is based on and claims priority under 35 U.S.C. § 119 to Korean Patent Application No. 10-2021-0094921, filed on Jul. 20, 2021, in the Korean Intellectual Property Office, the disclosure of which is incorporated by reference herein in its entirety.

BACKGROUND

1. Field

The disclosure relates to a simultaneous localization and mapping (SLAM) based electronic device and an operating method thereof.

2. Description of the Related Art

Simultaneous localization and mapping (SLAM) is a technology used in various fields such as augmented reality (AR), robots, or autonomous vehicles. In detail, SLAM is a technology of obtaining surrounding information while a device moves in a certain space, and estimating a map of the corresponding space and a current pose of the device based on the obtained information. For example, a device performing SLAM may acquire an image of a surrounding space of the device using a sensor such as a camera and the like, and estimate a map of the space and a current pose of the device through analysis of the acquired image and setting of coordinates.

SLAM may be divided into a front-end that extracts features for surrounding objects based on the data obtained from the sensor, and performs a three-dimensional space coordinate calculation, and a back-end that calculates an optimal solution for surrounding map information and current pose information based on the data received from the front-end.

As the number of features extracted from the front-end increases, precision of the surrounding map information and the current pose information estimated at the back-end may be improved. However, as an amount of calculation of the back-end increases, latency may occur during the estimation of the surrounding map information and the current pose information thereof.

When the real-time performance of the device performing SLAM is deteriorated due to the occurrence of latency, a situation may arise in which a user of the device feels inconvenience or uneasiness due to an error generated in the difference between the estimated pose and an image output to the user. Accordingly, a new method is demanded to secure the real-time performance of the output image while maintaining the precision of the estimated surrounding map information and the current pose information thereof.

SUMMARY

Provided is a simultaneous localization and mapping (SLAM)-based electronic device, which may select a feature to reduce a registration error, and may estimate surrounding map information and a current pose based on the selected feature, thereby securing precision of the estimated surrounding map and current pose and real-time performance of an image, and an operating method thereof.

The technical objectives to be achieved by the disclosure are not limited to the above-described objectives, and other technical objectives that are not mentioned herein would be clearly understood by a person skilled in the art from the description of the disclosure.

Additional aspects will be set forth in part in the description which follows and, in part, will be apparent from the description, or may be learned by practice of the presented embodiments of the disclosure.

According to an aspect of the disclosure, there is provided a simultaneous localization and mapping (SLAM)-based electronic device including: an data acquisition device configured to acquire external data; a memory configured to store a reference number; and a processor configured to be operatively connected to the data acquisition device and the memory, wherein the processor is configured to: extract features of surrounding objects from the acquired external data; calculate a score of a registration error of the extracted features based on a number of the extracted features being greater than the reference number stored in the memory; and select a number of features from among the extracted features based on the calculated score, the number of the selected features being equal to the reference number.

According to another aspect of the disclosure, an operating method of a simultaneous localization and mapping (SLAM)-based electronic device, the method including: acquiring external data from through a data acquisition device; extracting features of an object surrounding the electronic device, from the acquired external data; calculating a score of a registration error of the extracted features based on a number of the extracted features being greater than a reference number; and selecting a number of features from among the extracted features, based on the calculated score, the number of the selected features being equal to the reference number.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a flowchart of a method of calculating a pose error of a surrounding object of an electronic device according to an example embodiment;

DETAILED DESCRIPTION

Figure 1:
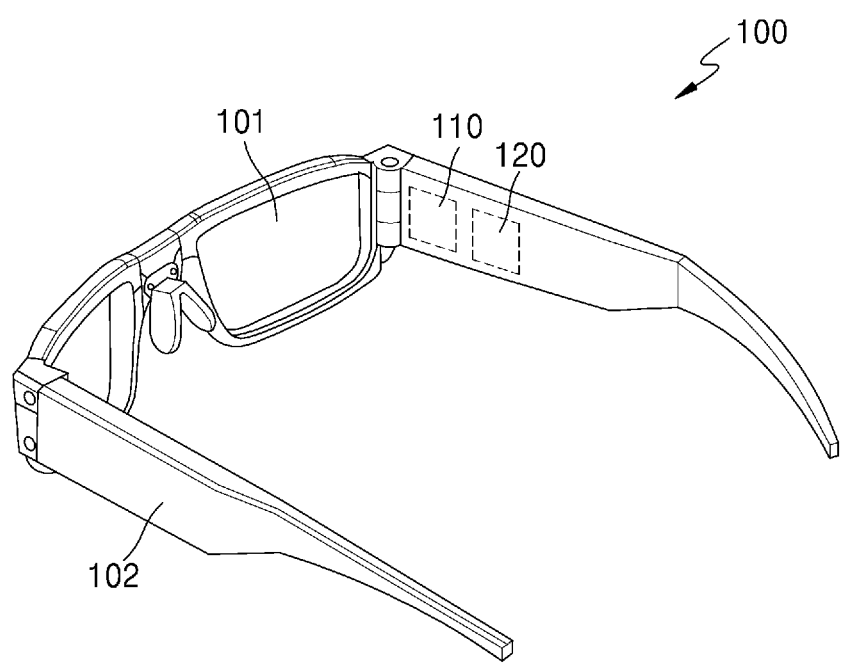
FIG. 1 is a perspective view of an electronic device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

In the example embodiments, when a layer, region, or component is referred to as being electrically connected to another layer, region, or component, it can be directly electrically connected to the other layer, region, or component or indirectly electrically connected to the other layer, region, or component via intervening layers, regions, or components. In the example embodiments below, when a part may "include" or "have" a certain constituent element, unless specified otherwise, it may not be construed to exclude another constituent element but may be construed to further include other constituent elements.

In the following example embodiments, it will be further understood that the terms "comprises" and/or "comprising" used herein specify the presence of stated features or components, but do not preclude the presence or addition of one or more other features or components.

Furthermore, terms such as "first" and "second" are used herein merely to describe a variety of constituent elements, but the constituent elements are not limited by the terms. Such terms are used only for the purpose of distinguishing one constituent element from another constituent element.

Furthermore, a term "world coordinate system" used herein may denote a three-dimensional coordinate system that is set with respect to the real world, and a term "display coordinate system" may denote a two-dimensional coordinate system that is set with respect to a display.

The description of the following example embodiments should not be construed as limiting the scope of rights, and contents that can be easily inferred by those skilled in the art should be construed as belonging to the scope of the disclosure. Hereinafter, exemplary embodiments will be described in detail with reference to the accompanying drawings.

FIG. 1 is a perspective view of an electronic device 100 according to an example embodiment.

Referring to FIG. 1, the electronic device 100 may include a data acquisition device 110 and a processor 120. According to an example embodiment, the electronic device 100 may be a simultaneous localization and mapping (SLAM) based electronic device configured to estimate, through SLAM, a surrounding map and a current pose of the electronic device 100.

For example, the processor 120 of the electronic device 100 may perform feature extraction and calculate space coordinates with respect to external data acquired through the data acquisition device 110, and perform the optimization on the extracted features and the space coordinate, thereby estimating information about the surrounding map and the current pose of the electronic device 100.

Furthermore, the processor 120 of the electronic device 100 may generate an augmented reality (AR) image based on the estimated surrounding map information and the current pose information of the electronic device 100, and display the generated AR image through a display, for example, a lens 101 of FIG. 1.

In the disclosure, the "AR image" may mean an image in which a real world image surrounding the electronic device 100 is fused with a virtual image. For example, although an AR image may mean an image obtained by overlaying a virtual image on a real world image, the disclosure is not limited thereto.

In this state, the real world image may mean a real scene that a user may see through the electronic device 100, and the real world image may include a real world object. Furthermore, the virtual image may mean an image that is not present in the real world formed by graphics processing, and the virtual image may include a digital or virtual object (AR object).

According to an example embodiment, the electronic device 100 may be a wearable electronic device to be worn on a part of the body of a user. For example, the electronic device 100 may further include the lens 101 and a connection portion 102 for fixing at least an area of the electronic device 100 to part of a use body.

In an example embodiment, the electronic device 100 may be a glasses-type wearable electronic device to be worn on the ears of a user, as illustrated in FIG. 1, but the disclosure is not limited thereto. In another example, the electronic device 100 may be a head-mount type wearable electronic device to be worn on the head of a user.

According to an example embodiment, although the data acquisition device 110 and the processor 120 may be arranged in the connection portion 102, the arrangement structure of the data acquisition device 110 and the processor 120 is not limited thereto. In another embodiment, the data acquisition device 110 and/or the processor 120 may be arranged in a surrounding area, for example, an edge, of the lens 101.

According to an example embodiment, the electronic device 100 may emit light including data about an AR image, and include optical components to adjust a movement path of the emitted light. The processor 120 may emit light including data about an AR image through the optical components, and allow the emitted light to reach the lens 101.

As the light including data about an AR image reaches the lens 101, the AR image may be displayed on the lens 101, and the electronic device 100 may provide the AR image to a user or a "wearer" through the above-described process.

Although the above example embodiment describes only that the electronic device 100 is a wearable electronic device, the application filed of the electronic device 100 is not limited thereto. According to other example embodiments, the electronic device 100 may be applied to unmanned aerial vehicles (UAVs) and/or autonomous vehicles that are capable of estimating, through SLAM, a surrounding map and a current pose thereof.

In the following description, the optical components of the electronic device 100 are described in detail with reference to FIG. 2.

Figure 2:
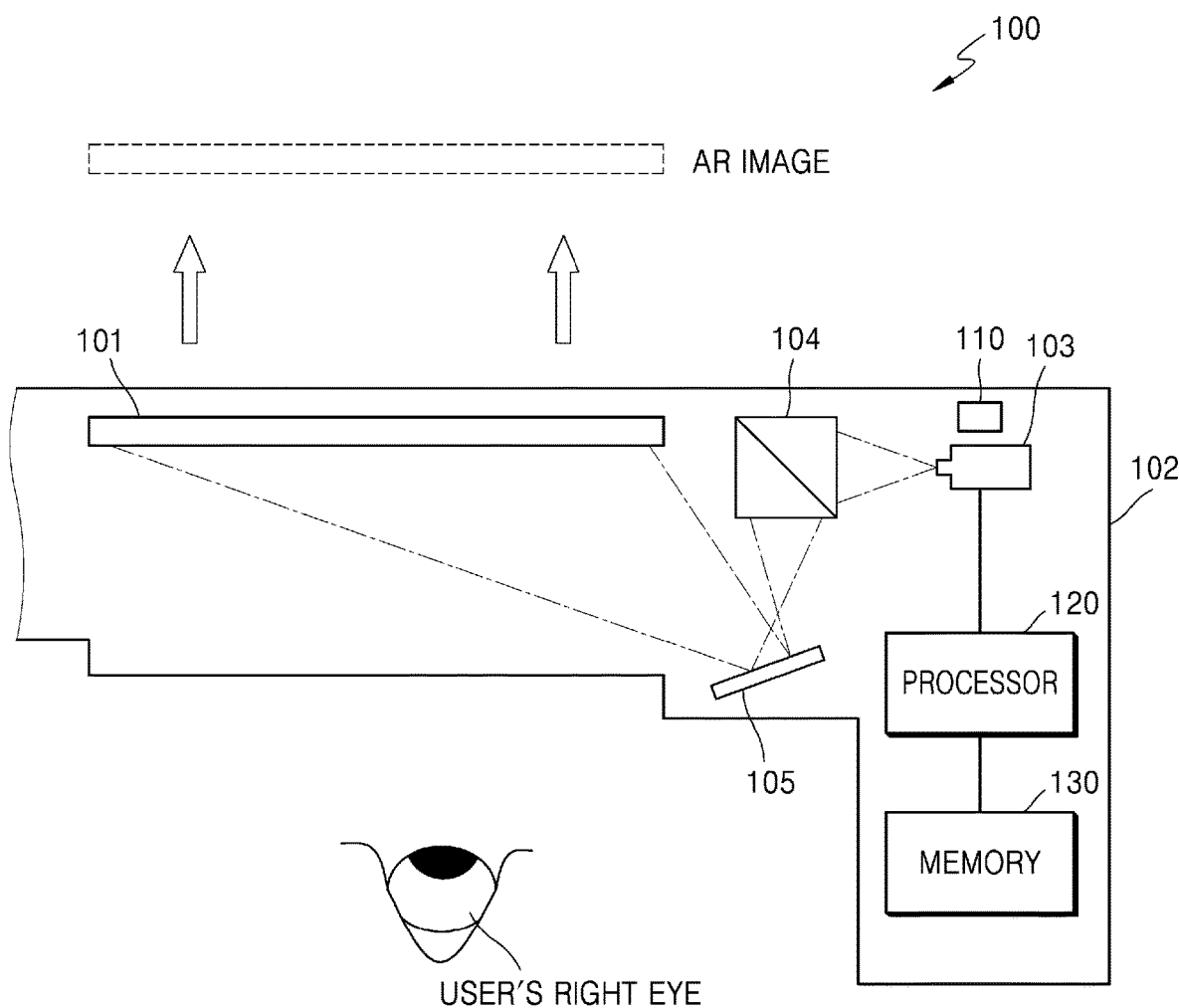
FIG. 2 is a cross-sectional view of a part of the electronic device of FIG. 1.

FIG. 2 is a cross-sectional view of a partial area of the electronic device of FIG. 1. FIG. 2 is a cross-sectional view of a portion of the electronic device 100 of FIG. 1 adjacent to the right eye of a user. Furthermore, although the electronic device 100 of FIG. 2 may be a glasses-type wearable device, for example, AR glasses, that is wearable on the eye of a user, the shape of the electronic device 100 is not limited to the illustrated example embodiment.

Referring to FIG. 2, the electronic device 100 according to an example embodiment may include the lens 101, the connection portion 102, a projector 103, a beam splitter 104, a mirror 105, the data acquisition device 110, the processor 120, and a memory 130. At least one of the constituent elements of the electronic device 100 according to an example embodiment may be the same or similar to at least one of the constituent elements of the electronic device 100 of FIG. 1, a redundant description thereof is omitted.

The processor 120 may estimate information about the surrounding map and the current pose of the electronic device 100, based on the external data acquired through the data acquisition device 110 and a data value stored in the memory 130. According to an example embodiment, the processor 120 may perform feature extraction and calculate the space coordinates with respect to the external data acquired through the data acquisition device 110, perform optimization on the extracted features and the space coordinate, thereby estimating information about the surrounding map and the current pose of the electronic device 100.

The processor 120 may generate an AR image based on the estimated information about the surrounding map and the current pose of the electronic device 100, and transmit data about the generated AR image to the projector 103.

The projector 103 may emit light including data about an AR image to the lens 101. For example, the processor 120 may be electrically or operatively connected to the projector 103 to control an operation of the projector 103, and the projector 103 may be controlled by the processor 120 to emit the light including the data about an AR image to the lens 101.

According to an example embodiment, the light emitted from the projector 103 may be reflected by the beam splitter 104 and/or the mirror 105 to reach the lens 101, but the disclosure is not limited thereto. According to an example embodiment, the projector 103 may be arranged to face the lens 101, and the light emitted from the projector 103 may reach the lens 101 without passing the beam splitter 104 and/or the mirror 105.

As the light emitted from the projector 103 reaches the lens 101, an AR image may be displayed on the lens 101. As a result, the lens 101 may operate as the display of the electronic device 100 that displays the AR image.

The lens 101 may be arranged to face an eyeball of a user, for example, the right eye of a user of FIG. 2, when a user wears the electronic device 100, and the electronic device 100 may provide an AR image to a user through the lens 101.

In the following description, the constituent elements to perform SLAM of the electronic device 100 are described in detail with reference to FIG. 3.

Figure 3:
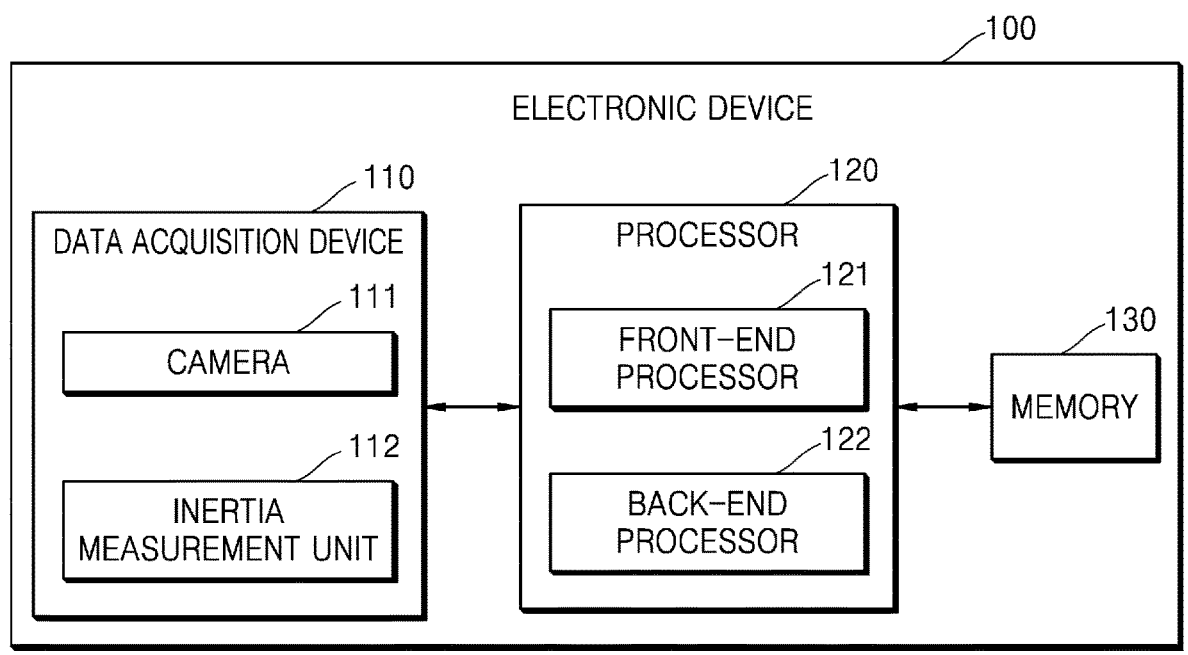
FIG. 3 is a block diagram of an electronic device according to an example embodiment.

FIG. 3 is a block diagram of an electronic device according to an example embodiment.

Referring to FIG. 3, the electronic device 100 according to an example embodiment may include the data acquisition device 110, the processor 120, and the memory 130. According to an example embodiment, at least one of the constituent elements of the electronic device 100 may be the same or similar to at least one of the constituent elements of the electronic device 100 of FIG. 1 and/or FIG. 2, and a redundant description thereof is omitted.

The data acquisition device 110 may acquire external data including data about a surrounding image of the electronic device 100 and/or data about a movement of the electronic device 100. The data acquisition device 110 and the processor 120 may be electrically or operatively connected to each other, and the external data acquired by the data acquisition device 110 may be transmitted to the processor 120.

According to an example embodiment, the data acquisition device 110 may include a camera 111 and an inertia measurement unit (IMU) 112, and may acquire the external data through the camera 111 and the IMU 112.

In an example embodiment, the camera 111 may be a device capable of capturing an image of a surrounding environment, and the processor 120 may acquire image data about surrounding objects of the electronic device 100 through the camera 111.

In another example embodiment, the IMU 112 is a device capable of measuring a movement in a three-dimensional space, and the processor 120 may acquire inertial data corresponding to the movement of the electronic device 100 through the IMU 112. For example, the inertia data may include data about at least one of a position, an orientation, an acceleration, and an angular velocity, but the disclosure is not limited thereto.

The processor 120 may be electrically or operatively connected to the data acquisition device 110 and/or the memory 130, and may control an overall operation of the electronic device 100 based on the external data acquired by the data acquisition device 110 and the data stored in the memory 130.

For example, the processor 120 may be implemented by an array of a plurality of logic gates, or a combination of a general purpose microprocessor and a memory storing a program to be executed on the microprocessor. However, the form of the processor 120 is not limited to the above-described example embodiment, and may be implemented in another form of hardware according to an embodiment. For instance, the processor 120 may include a central processing unit (CPU), a graphical processing unit (GPU), etc.

According to an example embodiment, the processor 120 may estimate a surrounding map and a pose (or current pose) of the electronic device 100 based on the external data acquired by the data acquisition device 110 and the data stored in the memory 130.

In the disclosure, the words "the pose of an electronic device" may mean data including position information of an electronic device, and such an expression may be used below in the same meaning. In this state, the pose data may include a 6 degrees of freedom pose information, and the 6 degrees of freedom pose information may include information indicating the position of the electronic device 100 and information indicating the orientation of the electronic device 100.

In an example embodiment, the processor 120 may extract features from surrounding objects based on the external data acquired through the data acquisition device 110, and calculate the space coordinates. For example, the processor 120 may extract features of the surrounding objects from an image of the surrounding objects through a feature detection algorithm, but the disclosure is not limited thereto.

In an example embodiment, the processor 120 may perform bundle adjustment or Kalman filtering based on the feature and the space coordinates of the surrounding objects, thereby estimating the surrounding map and the pose of the electronic device 100.

For example, the processor 120 may generate optimization data with reduced errors, or "optimal solution," by performing bundle adjustment or Kalman filtering on the extracted features, and estimate the surrounding map and the pose of the electronic device 100 based on the generated optimization data and the calculated space coordinates, but the disclosure is not limited thereto.

As the number of features extracted from the surrounding objects increases, accuracy or precision of the surrounding map and the pose of the electronic device 100 estimated by the processor 120 may increase. However, as a computing budget or the computing resource requirement of the processor 120 increases, latency is generated so that real-time performance of the estimated surrounding map and pose information may not be guaranteed.

However, when the number of features extracted from surrounding objects is greater than a reference number, the processor 120 of the electronic device 100 according to an example embodiment may select the reference number of features from among the extracted features, and estimate the surrounding map and the pose of the electronic device 100 based on the selected features, thereby securing the real-time performance of the surrounding map and pose information.

According to an example embodiment, the reference number may be a set number, which indicates the number of features which may generate latency, and such an expression may be used below in the same meaning. In this state, data about the set number may be stored in the memory 130, but the disclosure is not limited thereto.

Furthermore, when the set number of features are selected from among the extracted features, the processor 120 of the electronic device 100 selects features having a great influence on a registration error, or a "matching error," so that even accuracy of the surrounding map and pose information may be secured.

In the disclosure, the words "registration error" may mean an error between the pose of a true object in the world coordinate system and the pose of a virtual object (AR object) displayed on the display of an electronic device, and such an expression may be used below in the same meaning.

In other words, the electronic device 100 according to an example embodiment may secure the real-time performance and the accuracy of the surrounding map and pose information together through the above-described operations of the processor 120, the operation of selecting features by the processor 120 is described below in detail.

According to an example embodiment, the processor 120 may include a front-end processor 121 and a back-end processor 122 electrically or operatively connected to the front-end processor 121.

The front-end processor 121 may receive external data from the data acquisition device 110, extract features based on the received external data, and calculate space coordinates. For example, the front-end processor 121 may extract features of surrounding objects from an image of the surrounding object acquired through the data acquisition device 110, and calculate space coordinates based on inertia data acquired through the data acquisition device 110.

Furthermore, when the number of the extracted features is greater than the set number stored in the memory 130, the front-end processor 121 may determine that it is a situation where latency may occur, and select the set number of features from among the extracted features.

The back-end processor 122 may receive data about the extracted or selected features and the calculated space coordinates from the front-end processor 121, and estimate the surrounding map and the current pose of the electronic device 100 based on the received data. For example, the back-end processor 122 may estimate the surrounding map and the current pose of the electronic device 100 by performing bundle adjustment or Kalman filtering, for example, extended Kalman filtering, based on the data received from the front-end processor 121, but the disclosure is not limited thereto.

Although an example embodiment in which the processor 120 includes the front-end processor 121 and the back-end processor 122 is illustrated in FIG. 3, according to another example embodiment, the processor 120 may include a single processor that performs in time series the operation of the front-end processor 121 and the operation of the back-end processor 122.

The memory 130 may store pieces of data necessary for controlling the operation of the electronic device 100, and the processor 120 may control the operation of the electronic device 100 based on the data stored in the memory 130. For example, the memory 130 may store data about the number of features that serve as a standard for determining whether latency occurs and/or data about a threshold computing budget of the processor 120, but the disclosure is not limited thereto.

Figure 4:
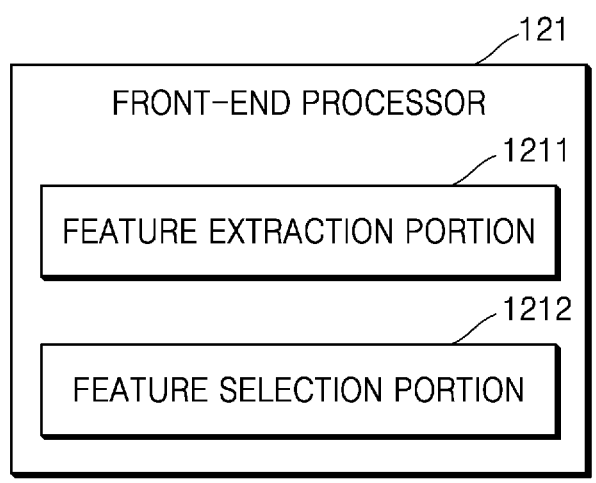
FIG. 4 is a block diagram of a front-end processor according to an example embodiment.

FIG. 4 is a block diagram of the front-end processor 121 according to an example embodiment. The front-end processor 121 illustrated in FIG. 4 may be an example embodiment of the front-end processor 121 of the electronic device 100 of FIG. 3, and a redundant description thereof is omitted.

Referring to FIG. 4, the front-end processor 121 according to an example embodiment may include a feature extraction portion 1211 and a feature selection portion 1212.

The feature extraction portion 1211 may be electrically or operatively connected to a data acquisition device, for example, the data acquisition device 110 of FIG. 3, and may extract features from external data received from the data acquisition device.

For example, the feature extraction portion 1211 may extract features of surrounding objects from an image of the surrounding objects received from the data acquisition device through feature detection algorithm. In this state, data about the features extracted through the feature extraction portion 1211 may be transmitted to the feature selection portion 1212 that is electrically connected to the feature extraction portion 1211.

Furthermore, the feature extraction portion 1211 may calculate space coordinates based on inertia data received from the data acquisition device, and the data about the space coordinates may be transmitted to the feature selection portion 1212 and/or a back-end processor, for example, the back-end processor 122 of FIG. 3.

The feature selection portion 1212 may select the set number of features from among the features extracted by the feature extraction portion 1211, and the selected features may be transmitted to the back-end processor that is electrically connected to the feature selection portion 1212.

In an embodiment, when the number of features extracted by the feature extraction portion 1211 is greater than the set number stored in a memory, for example, the memory 130 of FIG. 3, the feature selection portion 1212 may select features as many as the set number from among the extracted features.

For example, the feature selection portion 1212 may calculate a scope of a registration error of the features extracted by the feature extraction portion 1211, and select feature as many as the set number from among the extracted features, based on the scope of the registration error of the extracted features. However, a detailed process of calculating the score of a registration error of the extracted features and selecting the set number of features is described below.

Although an example embodiment in which the feature extraction portion 1211 and the feature selection portion 1212 of the front-end processor 121 are divided is illustrated in FIG. 4, the shape of the front-end processor 121 is not limited thereto. According to an example embodiment, the feature extraction portion 1211 and the feature selection portion 1212 may be implemented in the form of a single chip.

Figure 5:
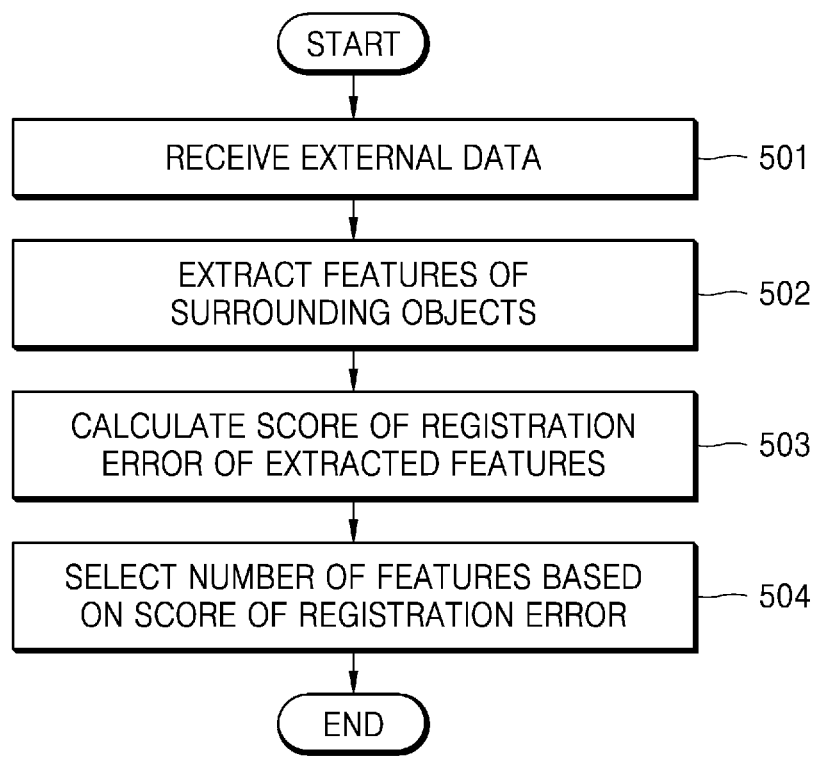
FIG. 5 is a flowchart of a method of selecting features through a front-end processor of an electronic device, according to an example embodiment.

FIG. 5 is a flowchart of a method of selecting features through a front-end processor of an electronic device according to an example embodiment.

Figure 6A:
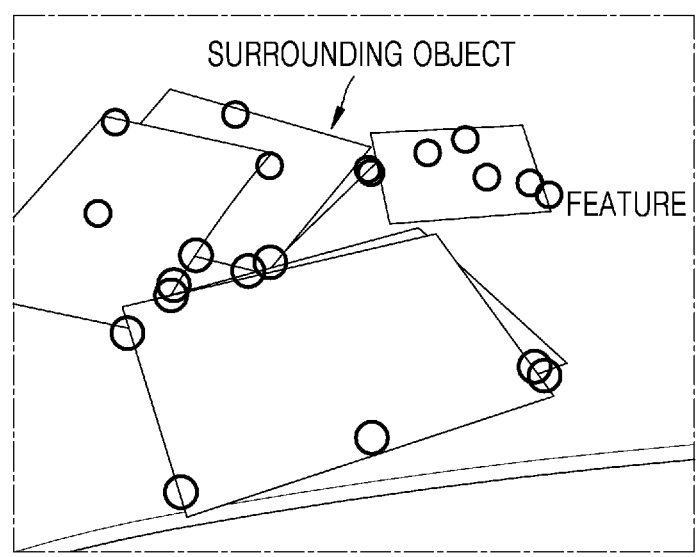
FIG. 6A illustrates features extracted from a surrounding object image according to an example embodiment when an electronic device is at a first position.
Figure 6B:
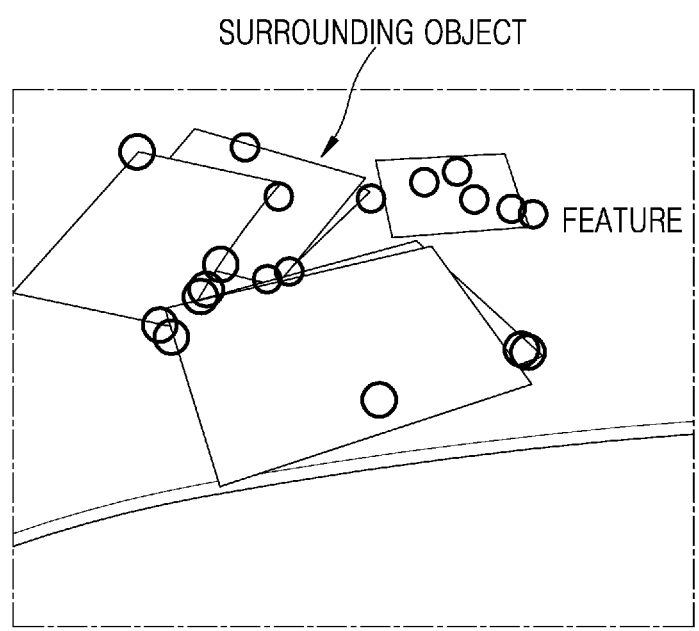
FIG. 6B illustrates features extracted from a surrounding object image according to an example embodiment when the electronic device of FIG. 6A is at a second position.
Figure 7:
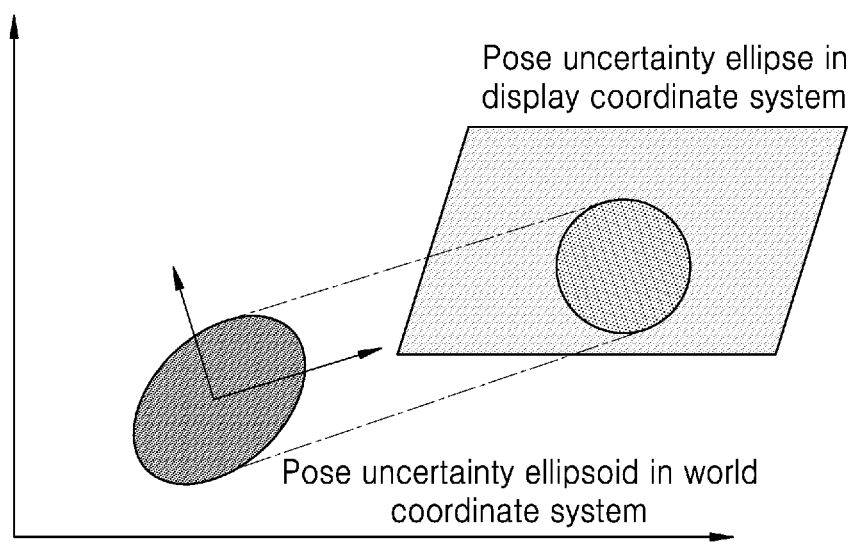
FIG. 7 is a diagram illustrating a relationship between uncertainty of a pose of an object estimated in the world coordinate system and uncertainty of a pose of an object estimated in a display coordinate system.

Furthermore, FIG. 6A illustrates features extracted from a surrounding object image according to an example embodiment when an electronic device is at a first position. FIG. 6B illustrates features extracted from a surrounding object image when the electronic device of FIG. 6A is at a second position. FIG. 7 is a diagram illustrating a relationship between uncertainty of a pose of an object estimated in the world coordinate system and uncertainty of a pose of an object estimated in the display coordinate system;

A method of selecting features through a front-end processor illustrated in FIG. 5 is described below with reference to FIGS. 6A, 6B, and 7.

In operation 501, a front-end processor according to an example embodiment, for example, the front-end processor 121 of FIGS. 3 and 4, may receive external data from a data acquisition device, for example, the data acquisition device 110 of FIG. 3. For example, the front-end processor may receive, from the data acquisition device, image data (hereinafter, referred to as the surrounding object image) about surrounding objects of an electronic device and/or inertial data corresponding to a movement of the electronic device.

Referring to FIGS. 6A and 6B, in operation 502, a front-end processor according to an example embodiment may extract features of surrounding objects from the surrounding object image received in operation 501. For example, the front-end processor may extract features of surrounding objects from the surrounding object image through a feature detection algorithm.

In operation 503, the front-end processor according to an example embodiment may calculate the score of a registration error of the features extracted in operation 502. For example, when the number of the features extracted in operation 502 is greater than the set number stored in a memory, for example, the memory 130 of FIG. 3, the front-end processor may determine that it is a situation where latency may occur, and calculate the score of a registration error of the extracted features.

In the disclosure, the "score of a registration error" is obtained by quantifying an effect of the features on a registration error, which may mean that as the score of a registration error increases, the effect of the features on a registration error increases.

According to the related art method, SLAM may be performed by calculating a score of a pose, for example, the 6 degrees of freedom pose, of an estimated error of the features extracted from surrounding objects in the world coordinate system, and selecting features that may reduce a pose estimated error of the surrounding objects in the world coordinate system.

However, in the case of an electronic device, for example, a wearable electronic device, for providing a user with an AR image, as surrounding objects are projected and displayed on the display of the electronic device, reducing a pose estimated error of the surrounding objects in the world coordinate system may not be concluded to be reducing a registration error. For example, while a surrounding object has a 6 degrees of freedom pose in the world coordinate system, the surrounding object has a 4 degrees of freedom pose in the display coordinate system that is set based on the display. Accordingly, reducing a rotation error, for example, a roll error, of the electronic device may not affect reducing the registration error.

In other words, as illustrated in FIG. 7, in the electronic device for providing an AR image, as a surrounding object is projected and displayed on the display, a pose estimated error of a surrounding object, for example, a pose uncertainty ellipsoid of FIG. 7, in the world coordinate system, and a registration error, for example, a pose uncertainty ellipse of FIG. 7, in the display coordinate system. Accordingly, in the method of selecting features according to the related art, which may reduce a pose estimated error of a surrounding object in the world coordinate system, a situation where the registration error increases may be generated.

In contrast, the front-end processor according to an example embodiment may reduce the registration error by calculating the score of a registration error of the extracted features, and not calculating the score of a pose estimated error of a surrounding object of the extracted features in the world coordinate system.

In an example embodiment, the front-end processor may generate an information matrix of the registration error of the extracted features based on an error between the pose of a surrounding object in the world coordinate system and the pose of a surrounding object in the display coordinate system, and calculate the score of a registration error of the extracted features through the information matrix. However, a detailed description about an operation of the front-end processor that generates an information matrix and calculates the score of a registration error is described below.

In operation 504, the front-end processor according to an example embodiment may select the set number of features from among the extracted features, based on the score of a registration error of the extracted features calculated in operation 503. In this state, the information about the features selected by the front-end processor may be transmitted to a back-end processor, for example, the back-end processor 122 of FIG. 3, and the back-end processor may estimate the surrounding map and the current pose of the electronic device by using the selected features.

Figure 8:
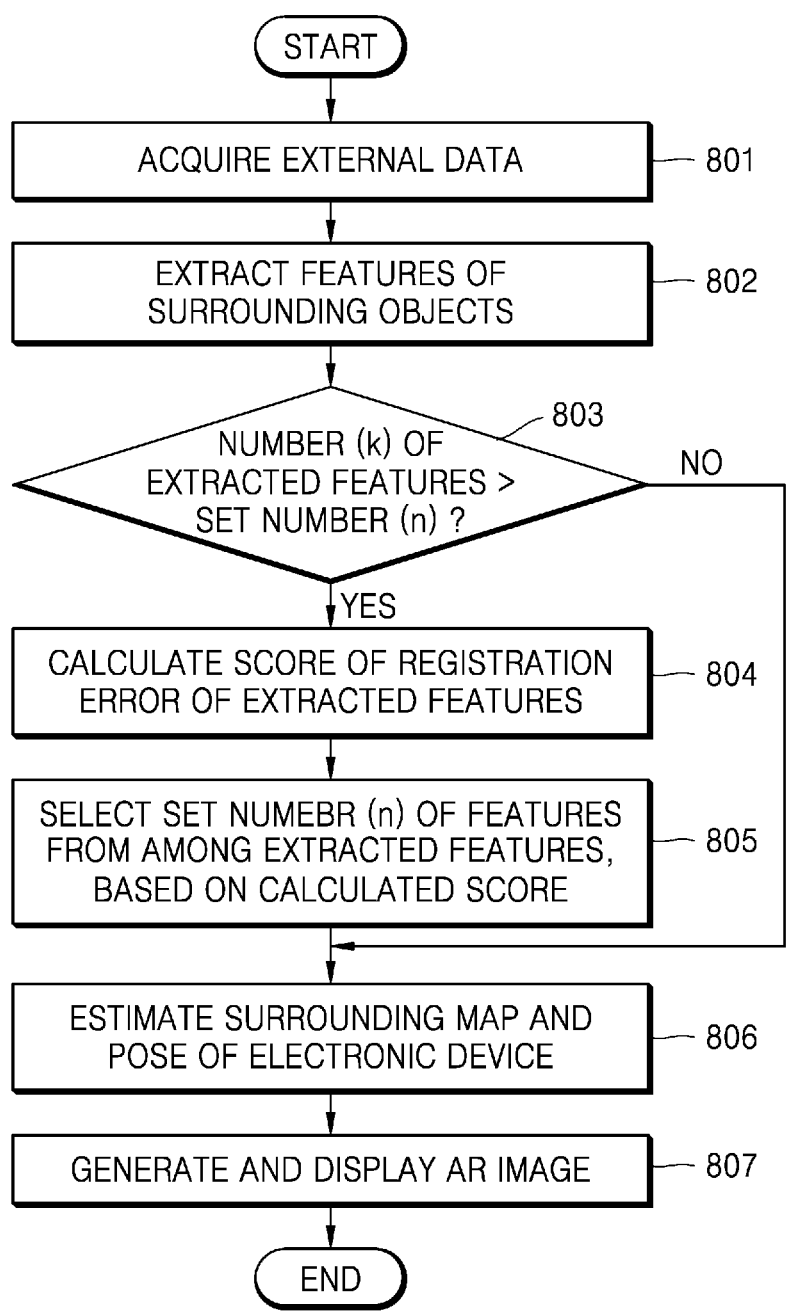
FIG. 8 is a flowchart of a method of operating an electronic device according to an example embodiment.

FIG. 8 is a flowchart of a method of operating an electronic device according to an example embodiment. FIG. 8 illustrates an operation method of the electronic device 100 illustrated in FIGS. 1 to 3.

Referring to FIG. 8, in operation 801, the electronic device according to an example embodiment may acquire external data through a data acquisition device, for example, the data acquisition device 110 of FIG. 3. For example, the electronic device may acquire image data about a surrounding object of the electronic device and/or inertia data corresponding to a movement of the electronic device, through the data acquisition device, but the disclosure is not limited thereto.

In operation 802, a processor of the electronic device according to an example embodiment, for example, the processor 120 of FIG. 3, may extract features of a surrounding object of the electronic device, based on the external data acquired in operation 801. For example, a front-end processor, for example, the front-end processor 121 of FIG. 3, constituting the processor may receive image data about the surrounding object from the data acquisition device, and extract features of the surrounding object from the image data with respect to the received surrounding object.

In operation 803, the processor of the electronic device according to an example embodiment may compare a number k of the features extracted in operation 802 with a set number n stored in a memory, for example, the memory 130 of FIG. 3.

In operation 803, when the number k of the extracted features is greater than the set number n, in operation 804, the processor of the electronic device according to an example embodiment may calculate the score of a registration error of the extracted features. For example, the processor may generate an information matrix of the registration error of the extracted features, and calculate the score of a registration error of the extracted features using the generated information matrix. A detailed description thereof is described with reference to FIG. 9.

In operation 805, the processor of the electronic device according to an example embodiment may select the set number n of features from among the extracted features based on the score of a registration error of the extracted features calculated in operation 804.

When the number of the extracted features is greater than the set number n, a computing budget of the processor increases so that latency may occur. However, the electronic device according to an example embodiment may reduce the occurrence of latency through the above-described operations 804 and 805.

In contrast, in operation 803, when the number k of the extracted features is less than or equal to the set number n, latency is not likely to occur, and thus the electronic device according to an example embodiment may perform operation 806, not performing operations 804 and 805.

In operation 806, the processor of the electronic device according to an example embodiment may perform bundle adjustment or Kalman filtering on the features, thereby estimating the surrounding map and the current pose of the electronic device. For example, a back-end processor, for example, the back-end processor 122 of FIG. 3, constituting the processor may estimate information about a surrounding map of the electronic device and 6 degrees of freedom pose of the electronic device, by performing bundle adjustment or Kalman filtering on the features extracted and/or selected by the front-end processor, but the disclosure is not limited thereto.

In an example, when the number k of features extracted in operation 802 is greater than the set number n, the processor may estimate the surrounding map and the current pose of the electronic device by performing bundle adjustment or Kalman filtering on the feature selected in the operation 805.

In another example, when the number k of features extracted in operation 802 is less than or equal to the set number n, the processor may estimate the surrounding map and the current pose of the electronic device by performing bundle adjustment or Kalman filtering on the extracted features.

In operation 807, the processor of the electronic device according to an embodiment may generate an AR image through the information the surrounding map and the pose of the electronic device estimated in operation 806, and display the generated AR image through the display, thereby providing a user with the AR image.

Figure 9:
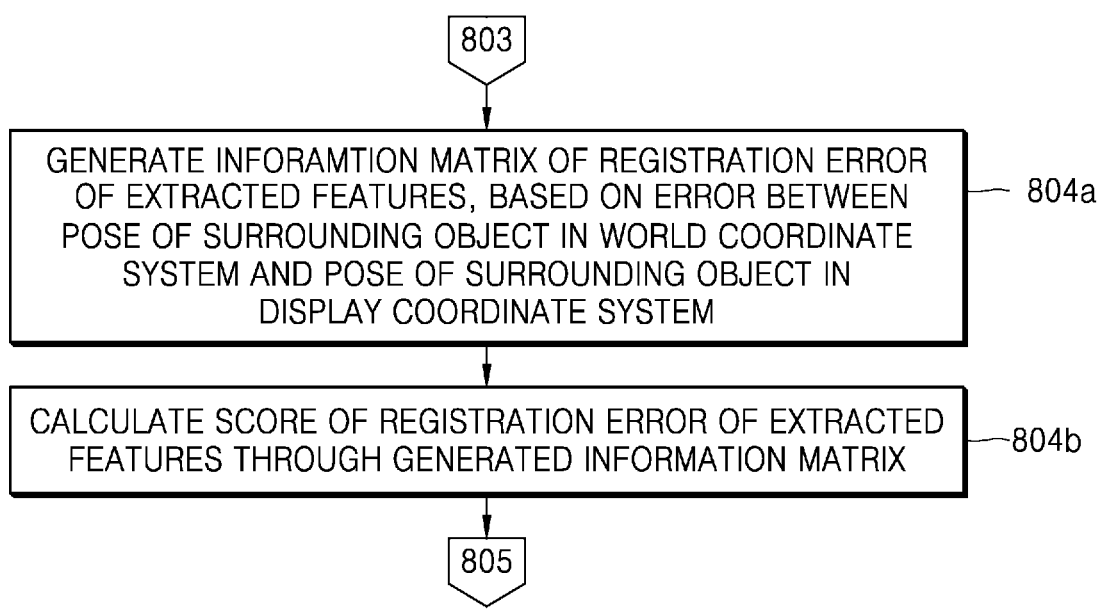
FIG. 9 is a flowchart of a method of calculating a score of a registration error of extracted features of an electronic device according to an example embodiment.

FIG. 9 is a flowchart of a method of calculating a score of a registration error of the extracted features of an electronic device according to an example embodiment.

Figure 10A:
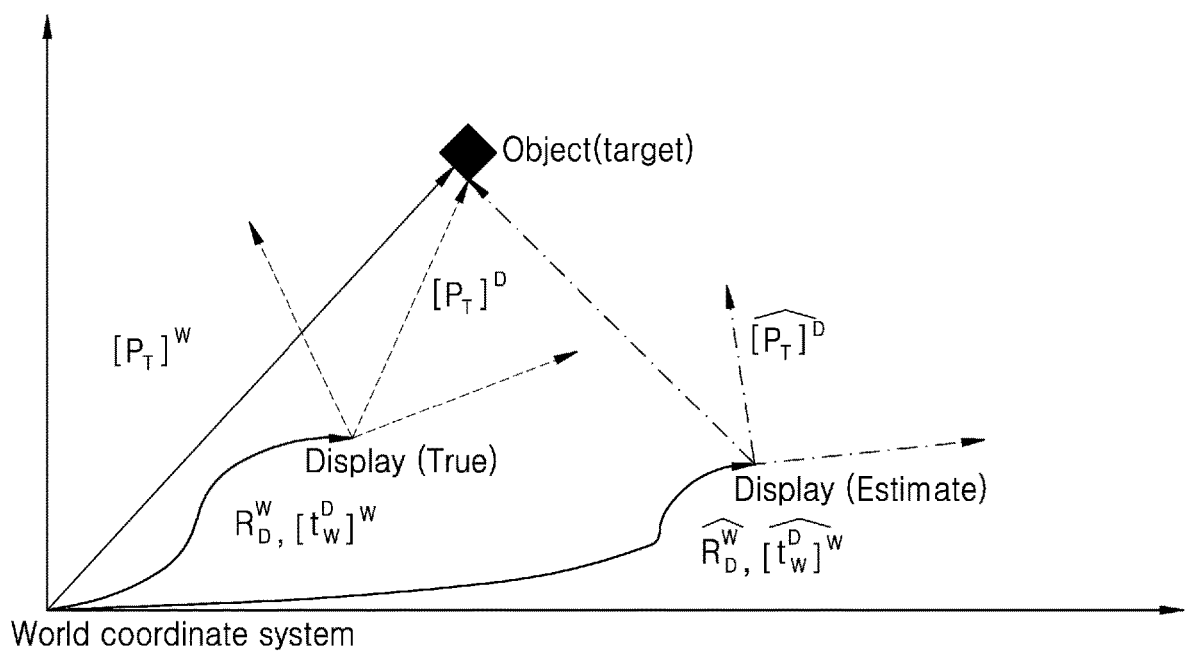
FIG. 10A is a graph showing the position of an object in the world coordinate system and the position of an object in a display coordinate system.
Figure 10B:
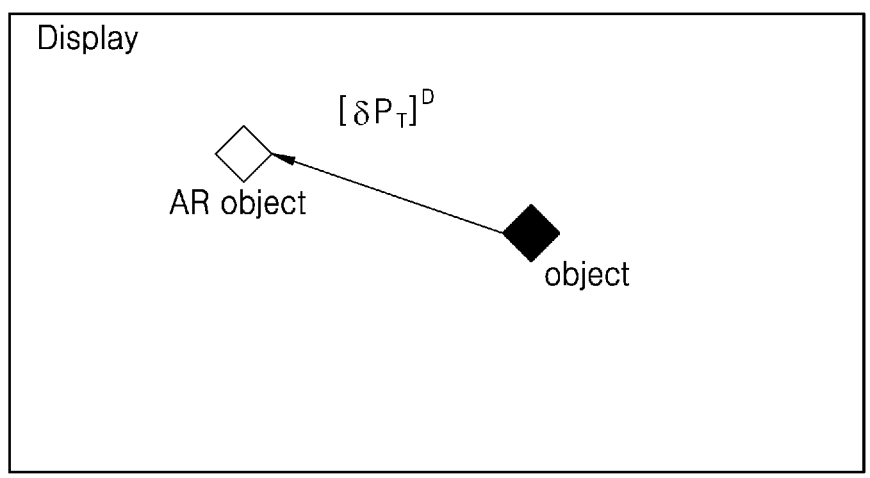
FIG. 10B illustrates a registration error of an AR object displayed on a display.

Furthermore, FIG. 10A is a graph showing the position of an object in the world coordinate system and the position of an object in a display coordinate system. FIG. 10B illustrates a registration error of an AR object displayed on the display.

FIG. 9 is a flowchart for explaining operation 804 of FIG. 8 in detail. A method of calculating the score of a registration error of the extracted features of FIG. 9 is described below with reference to FIGS. 10A and 10B.

Referring to FIGS. 9, 10A, and 10B, in operation 804a, a processor, for example, the processor 120 of FIG. 3, of the electronic device according to an example embodiment may generate an information matrix of a registration error of the extracted features through operation 802 of FIG. 8.

In the disclosure, the "information matrix of a registration error" is a matrix that is obtained by quantifying an effect of the features on a registration error, and such an expression may be used below in the same meaning.

SLAM is an algorithm for estimating a state variable including a pose, for example, 6 degrees of freedom pose, of an electronic device and the positions of features, as in Equation 1, and a covariance of an estimated state variable may be expressed as in Equation 2.

$$x_k = [p\, v\, q\, b_a\, b_g\, p_{f_1} \ldots p_{f_N}]^T \quad \text{[Equation 1]}$$

$$\Sigma_{x_k} = E[(x_k - \widehat{x_k})(x_k - \widehat{x_k}^T)] \quad \text{[Equation 2]}$$

In Equation 1, $x_k$ denotes a surrounding object and a state variable of the electronic device to be estimated at a k time step, p denotes a positon of the electronic device, v denotes a speed of the electronic device, and q denotes a rotation quaternion of the electronic device. Furthermore, $b_a$ denotes an acceleration bias of an inertia measurement unit, for example, the IMU 112 of FIG. 3, of the electronic device, $b_g$ denotes an angular velocity bias of the inertia measurement unit, and $p_{f_N}$ denotes a position of an N-th feature of the surrounding object.

In Equation 2, $\widehat{x_k}$ denotes an estimated state variable, and $\Sigma_{x_k}$ denotes a covariance matrix of the estimated state variable.

In this state, a degree of the effect of the extracted features on the estimation of the state variable $x_k$ may be calculated through the pose and uncertainty of features, and the effect of the extracted features on the estimation of the state variable, or "degree of observability" may be quantified through the information matrix to a pose estimated error. In the disclosure, the "information matrix to a pose estimated error" may mean a matrix that is obtained by quantifying the effect of features on a pose estimated error of a surrounding object in the world coordinate system, and such an expression may be used below in the same meaning.

According to an example embodiment, the processor of the electronic device may calculate or generate, through Equation 3, the information matrix to a pose estimated error of the features extracted in operation 802 of FIG. 8.

$$J_{k+1}=[\Phi_{k+1,k}{}^{T}]^{-1}J_k\Phi_{k+1,k}{}^{-1}+H_{k+1}{}^{T}R_{k+1}{}^{-1}H_{k+1} \quad \text{[Equation 3]}$$

In Equation 3 of the disclosure, denotes the information matrix to a pose estimated error of the features extracted at a (k+1)th time step. Furthermore, $\Psi_{k+1,k}$ denotes a state transition matrix between the k-th time step and the (k+1)th time step, $H_{k+1}$ denotes a measurement Jacobian matrix at the (k+1)th time step, and $R_{k+1}$ denotes a measurement noise matrix at the (k+1)th time step.

Data about the above-described state transition matrix, measurement Jacobian matrix, and measurement noise matrix may be defined by a SLAM algorithm, and the processor may generate the information matrix to a pose estimated error of the features extracted through the data defined by the SLAM algorithm.

According to an example embodiment, the processor of the electronic device may generate the information matrix of a registration error of the extracted features, based on the information matrix to the generated pose estimated error and an error between the pose of a surrounding object of the electronic device in the world coordinate system and the pose of a surrounding object in the display coordinate system.

In the case of the electronic device for providing a user with an AR image, as a surrounding object of the electronic device is projected and displayed on the display of the electronic device, it may be important to estimate the pose of a surrounding object in the display coordinate system.

Referring to FIG. 10A, according to the difference in the origin between the world coordinate system and the display coordinate system, a position $[P_T]^W$ of a surrounding object of the electronic device in the world coordinate system and a position $[P_T]^D$ of a surrounding object in the display coordinate system may be defined to be different from each other. In this state, a relationship between the position of a surrounding object in the display coordinate system and the pose $([t_W{}^D]^W, R_D{}^W)$ of the display in the world coordinate system may be expressed as in Equation 4.

$$[P_T]^D=(R_D{}^W)^T([P_T]^W-[t_W{}^D]^W) \quad \text{[Equation 4]}$$

In FIG. 10A and Equation 4, $[P_T]^W$ denotes the position of a surrounding object in the display coordinate system, and $[P_T]^W$ denotes the position of a surrounding object in the world coordinate system. Furthermore, $[t_W{}^D]^W$ denotes the position of the display in the world coordinate system, and $R_D{}^W$ denotes the orientation of the display in the world coordinate system.

In this state, the position $[t_W{}^D]^W$ and the orientation $R_D{}^W$ of the display in the world coordinate system include an estimated error of the SLAM algorithm (hereinafter, referred to as the "SLAM error"), and the relationship between the position of the display in the world coordinate system and the estimated error may be expressed as in Equations 5 and 6.

$$R_D{}^W=(I-\text{skew}(\varepsilon))\widehat{R_D^W} \quad \text{[Equation 5]}$$

$$[t_W{}^D]^W=\widehat{[t_W^D]^W}-\delta t \quad \text{[Equation 6]}$$

In Equations 5 and 6, E denotes an orientation estimated error (or "rotation error") of the SLAM algorithm, δt denotes a position estimated error (or "translation error") of the SLAM algorithm, and skew denotes a skew-symmetric matrix. Furthermore, $\widehat{R_D^W}$ denotes an estimated value of the position of the display in the world coordinate system, and $\widehat{[t_W^D]^W}$ denotes an estimated value of the orientation of the display in the world coordinate system.

Referring to FIG. 10B, a difference $[\delta P_T]^D$ between a real position of a surrounding object in the display coordinate system and a position of an object (AR object) estimated by the SLAM algorithm may be expressed as in Equation 7, and a registration error may be calculated by extracting a two-dimensional plane value corresponding to the display coordinate system at $[\delta P_T]^D$.

$$[P_T]^D=\widehat{[P_T]^D}-[\delta P_T]^D \quad \text{[Equation 7]}$$

Furthermore, in summary of Equations 5 to 7, the difference $[\delta P_T]^D$ between the real position of a surrounding object in the display coordinate system and the position of an object (AR object) estimated by the SLAM algorithm may be expressed as in Equation 8.

$$[\delta P_T]^D = A(\delta Pose) \quad \text{[Equation 8]}$$

$$= \hat{R}_W^D[-I_{3\times3}\ d\cdot\text{skew}(\widehat{R_D^W}[u_T]^D)]\begin{bmatrix}\delta t \\ \varepsilon\end{bmatrix}$$

$$= \hat{R}_W^D[-I_{3\times3}\ \text{skew}([P_T]^W - \widehat{[t_W^D]^W})]\begin{bmatrix}\delta t \\ \varepsilon\end{bmatrix}$$

$$[P_T]^D = d*[u_T]^D \quad \text{[Equation 9]}$$

In Equation 8, d denotes a distance from the origin of the display to a surrounding object, $[u_T]^D$ denotes a unit vector from the origin of the display toward a surrounding object, and the position $[P_T]^D$ of a surrounding object in the display coordinate system may be expressed as shown in Equation 9.

According to an example embodiment, the processor of the electronic device may calculate a covariance matrix $\Sigma^{[\delta P_T]^D}$ about a difference $[\delta P_T]^D$ between the real position of a surrounding object in the display coordinate system and the position of an estimated object, and generate information matrix $J^{[\delta P_T]^D}$ of the registration error of the extracted features based on the calculated covariance matrix.

In an example, the processor may calculate the covariance matrix $\Sigma^{[\delta P_T]^D}$ of the difference between the real position of a surrounding object in the display coordinate system and the position of an estimated object, based on a matrix A obtained from Equation 8.

In this state, the processor may obtain the matrix A from Equation 8, by receiving information about the position $[P_T]^D$ of a surrounding object in the display coordinate system from an external module capable of estimating the position of a surrounding object, or assuming the position of a surrounding object in the display coordinate system, and a detailed description thereof is described below.

For example, the covariance matrix $\Sigma^{[\delta P_T]^D}$ about the difference between the real position of a surrounding object in the display coordinate system and the position of an estimated object may be expressed as in Equation 10, and the processor may calculate the covariance matrix $\Sigma^{[\delta P_T]^D}$ about the difference between the real position of a surrounding object in the display coordinate system and the position of an estimated object by using the matrix A obtained through Equation 8.

$$\Sigma^{[\delta P_T]^D} = A \Sigma^{Pose} A^T \qquad \text{[Equation 10]}$$

In another example, the processor may generate information matrix of the registration error of the extracted features, based on a correlation between the covariance matrix $\Sigma^{[\delta P_T]^D}$ about the difference between the real position of a surrounding object in the display coordinate system and the position of an estimated object and the information matrix of the registration error of the extracted features.

For example, as the above-described covariance matrix $\Sigma^{[\delta P_T]^D}$ and the information matrix of the registration error of the extracted features have an inverse matrix relationship with each other, the processor may generate an information matrix of the registration error of the extracted features as in Equation 11, by obtaining an inverse matrix of the above-described covariance matrix $\Sigma^{[\delta P_T]^D}$.

$$J^{[\delta P_T]^D} = (A^T)^{-1} J^{Pose} A^{-1} \qquad \text{[Equation 11]}$$

In other words, the processor of the electronic device according to an example embodiment may generate the information matrix of the registration error of the extracted features, through the above-described process, based on an error between the pose of a surrounding object in the world coordinate system and the pose of a surrounding object in the display coordinate system.

In operation 804b, the processor of the electronic device according to an example embodiment may calculate the score of a registration error of the extracted features, based on the information matrix of the registration error of the extracted features generated in operation 804a.

According to an example embodiment, the processor may calculate the score of a registration error of the extracted features by scalarizing the information matrix about a registration error that is a three-dimensional matrix.

In an example, the processor may calculate the score of a registration error of the extracted features (information score) by performing a log-determinant operation on the information matrix about a registration error as in Equation 12, but the disclosure is not limited thereto.

$$(\text{Information Score}) = \log \det\{J^{[\delta P_T]^{D,2D\ Plane}}\} \qquad \text{[Equation 12]}$$

In another example, the processor may extract a two-dimensional (2D) value corresponding to the display coordinate system from the information matrix about a registration error, by calculating a trace or the maximum eigenvalue of the information matrix about a registration error, and scalarize the extracted two-dimensional value.

According to an example embodiment, the processor may select the set number of features from among the extracted features, based on the score of a registration error of the extracted features calculated through the above-described operations 804a and 804b.

For example, the processor may combine the set number of features among the extracted features, calculate the score of a registration error for each of the combined features, and then select features of a combination having a high score of a registration error, but the disclosure is not limited thereto. In another example, the processor may calculate a score of a registration error for each of the extracted features, and select the set number of features having a high score of a registration error.

According to another example embodiment, the processor may select the set number of features from among the extracted features feature, based on the score of a registration error of the extracted features calculated through the above-described operations 804a to 804b, an amount of change in the intensity of features, and the tracking frequency of features.

For example, the processor may calculate a reference value $Cost_{overall}$ for feature selection as in Equation 13, based on the score of a registration error of the extracted features, the amount of change in the intensity of features, and the tracking frequency of features, and select the set number of features having a high reference value.

$$Cost_{overall} = w_1 Cost_{Information} + w_2 Cost_{Appearance} + w_3 Cost_{Lifetime} \qquad \text{[Equation 13]}$$

In Equation 13, $Cost_{Information}$ may be a value obtained by converting the score of a registration error to the reference value, and $Cost_{Information}$ may be increased as the score of a registration error is higher. $Cost_{Appearance}$ may be a value obtained by converting the amount of change in the intensity of a feature at a set time step, compared with a surrounding pixel, to the reference value, and as the amount of change in the intensity is increased, $Cost_{Appearance}$ may be increased. $Cost_{Lifetime}$ may be a value obtained by converting a tracking frequency of features from an image of a surrounding object to the reference value, and as the tracking frequency of features is higher, $Cost_{Lifetime}$ may be increased.

Furthermore, in Equation 13, $w_1$, $w_2$, and $w_3$ may mean weights to $Cost_{Information}$, $Cost_{Appearance}$, and $Cost_{Lifetime}$, respectively, and $w_1$, $w_2$, and $w_3$ may be fixed values or may vary depending on the types of the electronic device or the user settings.

In an example, $w_2$ and $w_3$ may be set to "0" when the amount of change in the intensity of features and/or the tracking frequency of features are considered in the process of calculating the score of a registration error of the extracted features, but the disclosure is not limited thereto.

FIG. 11 is a flowchart of a method of calculating a pose error of a surrounding object of an electronic device according to an example embodiment. FIG. 11 shows a process of generating an information matrix through Equation 8 in operation 804a of FIG. 9.

Referring to FIG. 11, in operation 1101, the processor, for example, the processor 120 of FIG. 3, of an electronic device according to an example embodiment, for example, the electronic device 100 of FIGS. 1 to 3, may determine whether the position estimation of a surrounding object is possible.

For example, when the electronic device is operatively connected to an external module, for example, an object tracking module, capable of estimating a surrounding object, the electronic device may estimate the position of a surrounding object through the external module, and thus the processor may determine that position estimation of a surrounding object is possible.

In contrast, when the electronic device is not connected to the external module, as the electronic device is unable to estimate the position of a surrounding object, the processor may determine that it is impossible to estimate the position of a surrounding object.

In operation 1101, when it is determined that the estimation of the position of a surrounding object is possible, in operation 1102, the processor of the electronic device according to an example embodiment may receive information about the position of a surrounding object from the external module. For example, the external module may estimate the position of a surrounding object in the display coordinate system and generate information about the position of a surrounding object, and the processor may receive the information about the position of a surrounding object generated from the external module.

In operation 1103, the processor of the electronic device according to an example embodiment may generate information matrix of the registration error of the extracted features, based on the information about the position of a surrounding object received in operation 1102.

In an example embodiment, the processor may calculate the covariance matrix about the difference between the real position of a surrounding object in the display coordinate system and the position of an estimated object, through the matrix A calculated above in Equation 8, calculate an inverse matrix of the calculated covariance matrix, and generate the information matrix of the registration error of the extracted features. In this state, the processor may calculate the matrix A through Equation 14.

$$A = \widehat{R_{w}^{D}}[-I_{3\times 3} \text{ skew}([P_T]^W - [\widetilde{t_W^D}])]$$
$$= \widehat{R_{w}^{D}}[-I_{3\times 3} \ d \cdot \text{skew}(\widehat{R_n^W}[\widetilde{u_T}]^D)]$$

[Equation 14]

For example, the processor may calculate the matrix A through a pose, for example, $\widehat{R_D^W}$ or $[\widehat{t_W^D}]^W$, of the display estimated through the SLAM algorithm, and the information about the position, for example, d and $[u_T]^D$, of a surrounding object obtained through the external module.

In contrast, in operation 1101, when it is determined that the estimation of the position of a surrounding object is impossible, in operation 1104, the processor of the electronic device according to an example embodiment may generate information about the position of a virtual surrounding object by assuming the position of a surrounding object in the display coordinate system.

For example, a user of the electronic device may be highly likely to act so that a surrounding object is located at the center of the display. Accordingly, the processor may assume that a surrounding object is located at the origin of the display coordinate system, and generate information about the position of a surrounding object based on the above assumption, but the disclosure is not limited thereto.

In operation 1105, the processor of the electronic device according to an example embodiment an information matrix of the registration error of the extracted features, based on the information about the position of a virtual surrounding object generated in operation 1104.

For example, the processor may calculate the matrix A by applying the pose, for example, $\widehat{R_D^W}$ or $[\widehat{t_W^D}]^W$, of the display estimated through the SLAM algorithm and the information about the position of a surrounding object generated through the assumption, to Equation 14, and generated the information matrix of the registration error of the extracted features based on the matrix A, but the disclosure is not limited thereto.

Figure 12:
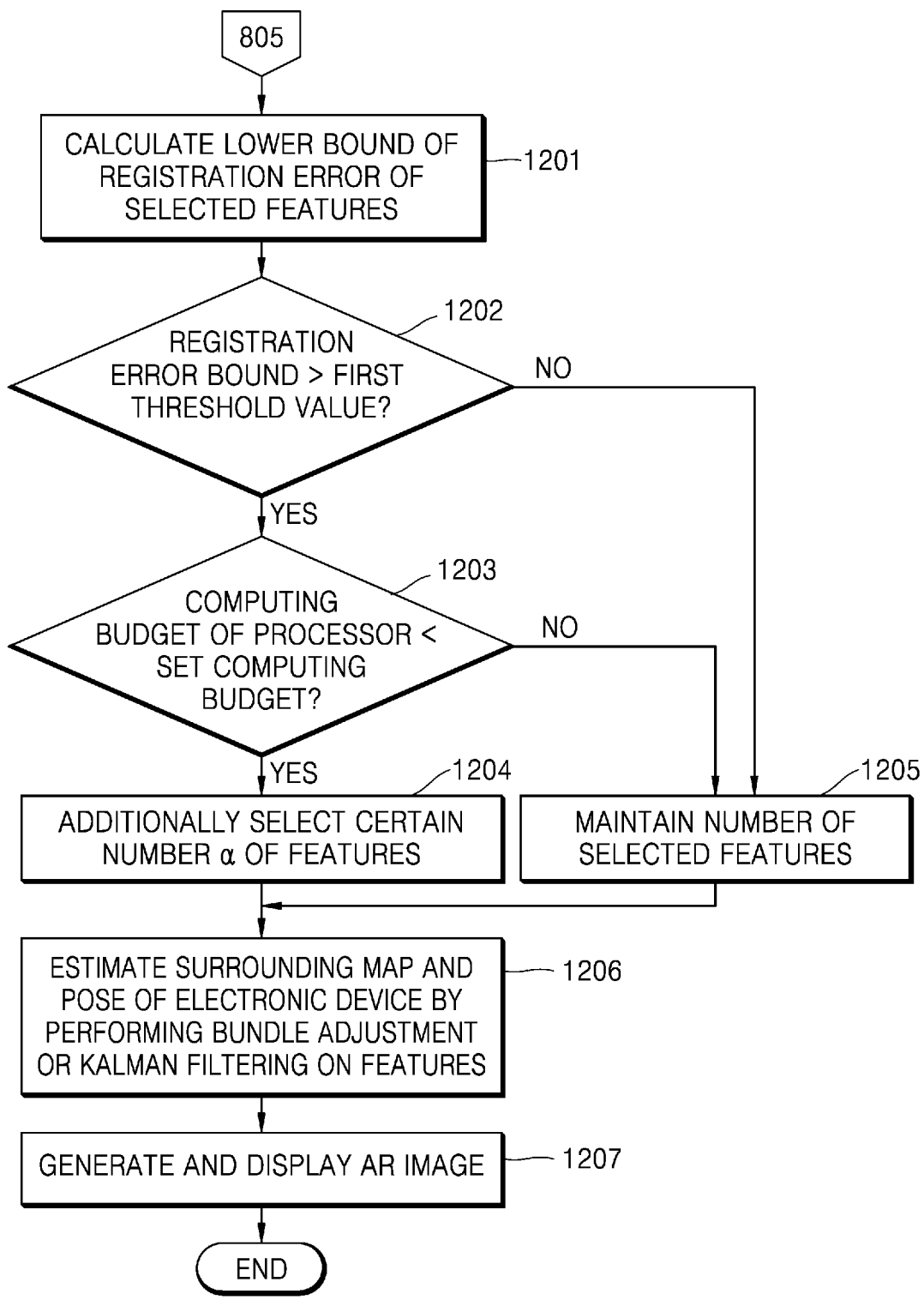
FIG. 12 is a flowchart of a method of increasing the number of features in an electronic device according to an example embodiment.

FIG. 12 is a flowchart of a method of increasing the number of features in an electronic device according to an example embodiment. FIG. 12 shows a methods of additionally selecting features after operation 805 of FIG. 8.

Referring to FIG. 12, in operation 1201, the processor, for example, the processor 120 of FIG. 3, of an electronic device according to an example embodiment, for example, the electronic device 100 of FIGS. 1 to 3, may calculate a lower bound (or "lower limit") of the registration error of features selected in operation 805 of FIG. 8.

According to the Cramér-Rao lower bound theorem, an inverse matrix of the information matrix $J^{[\delta P_T]^D}$ about the registration error of the selected features corresponds to a lower bound of an optimal estimator, for example, an estimated covariance matrix $\Sigma^{[\delta P_T]^D}$ of Kalman filtering.

In this state, a relationship between an information matrix $J^{[\delta P_T]^{D,2D\ Plane}}$ that takes a two-dimensional value corresponding to the display coordinate system from the information matrix $J^{[\delta P_T]^D}$ about the registration error and a covariance matrix $\Sigma^{[\delta P_T]^{D,2D\ Plane}}$ that takes a two-dimensional value corresponding to the display coordinate system from the estimated covariance matrix may be expressed as in Equation 15.

$$\Sigma^{[\delta P_T]^{D,2D\ Plane}} \geq \{J^{[\delta P_T]^{D,2D\ Plane}}\}^{-1}$$

[Equation 15]

According to an example embodiment, the covariance matrix $\Sigma^{[\delta P_T]^{D,2D\ Plane}}$ that takes a two-dimensional value corresponding to the display coordinate system from the estimated covariance matrix may be expressed by a 2×2 matrix as in Equation 16, and the processor may calculate the lower bound of the registration error by using a diagonal element of the covariance matrix $\Sigma^{[\delta P_T]^{D,2D\ Plane}}$ that takes a two-dimensional value corresponding to the display coordinate system.

$$\Sigma^{[\delta P_T]^{D,2D\ Plane}} = \begin{pmatrix} \sigma_{xx}^2 & \sigma_{xy}^2 \\ \sigma_{xy}^2 & \sigma_{yy}^2 \end{pmatrix}$$

[Equation 16]

For example, the processor may calculate the lower bound of the registration error by performing a square root operation on the diagonal element of the covariance matrix $\Sigma^{[\delta P_T]^{D,2D\ Plane}}$ that takes a two-dimensional value corresponding to the display coordinate system, as in Equation 17, but the disclosure is not limited thereto.

$$\text{(Registration Error lower Bound)} = \sqrt{\sigma_{xx}^2 + \sigma_{yy}^2}$$

[Equation 17]

In operation 1202, the processor of the electronic device according to an example embodiment may determine whether a lower bound of the registration error calculated in operation 1201 is less than a first threshold value stored in a memory, for example, the memory 130 of FIG. 3.

In the disclosure, the "first threshold value" may mean an upper threshold value of the registration error set to reduce the registration error. For example, when the lower bound of the registration error is greater than the first threshold value, the registration error may not be reduced only by performing optimization on the selected features, for example, Kalman filtering. In contrast, when the lower bound of the registration error is less than or equal to the first threshold value, a registration error of a desired level may be secured by performing optimization on the selected features.

In operation 1202, when the lower bound of the registration error is determined to be greater than the first threshold value, in operation 1203, the processor of the electronic device according to an example embodiment may determine whether a computing budget of the processor is less than a reference computing budget stored in a memory.

According to an example embodiment, the reference computing budget may be "a set computing budget", which indicates a value obtained by quantifying the threshold computing budget of the processor, and when the computing budget of the processor is greater than the set computing budget, the computing budget of the processor excessively increases so that latency may occur. Such an expression may be used below in the same meaning.

For example, when the lower bound of the registration error is greater than the first threshold value, the processor may determine that it is insufficient to reduce the registration error with the selected features only, and the computing budget of the processor may be compared with the set computing budget to determine that whether it is a situation in which additional selection of features is possible.

In contrast, in operation 1202, when the lower bound of the registration error is less than or equal to the first threshold value, the processor of the electronic device according to an example embodiment may determine that it is a situation in which the registration error of a desired level may be secured with the selected features only, and maintain the number of the selected features through operation 1205.

In operation 1203, when the computing budget of the processor is determined to be less than the set computing budget, in operation 1204, the processor of the electronic device according to an example embodiment may additionally select a certain number α of features from among the extracted features.

When the computing budget of the processor is less than the set computing budget, latency may not occur even when features are additionally selected. Accordingly, when the lower bound of the registration error is greater than the first threshold value, and the computing budget of the processor is less than the set computing budget, the processor may additionally select features to secure registration error performance.

In contrast, in operation 1203, when the computing budget of the processor is determined to be greater than the set computing budget, in operation 1205, the processor of the electronic device according to an example embodiment may determine that it is a situation in which features may not be additionally selected, and maintain the number of selected features.

In operation 1206, the processor of the electronic device according to an example embodiment may estimate the surrounding map and the current pose of the electronic device, by performing the bundle adjustment or Kalman filtering on the features.

According to an example embodiment, the processor may estimate information about a surrounding map of the electronic device and 6 degrees of freedom pose of the electronic device, by additionally performing the bundle adjustment or Kalman filtering on the features extracted from surrounding objects and/or the selected features through operation 1204.

For example, when the lower bound of the registration error is greater than the first threshold value, and the computing budget of the processor is less than the set computing budget, the processor may perform optimization on the extracted features and a certain number α of the additionally selected features. In another example, when the lower bound of the registration error is less than or equal to the first threshold value, and the computing budget of the processor is greater than the set computing budget, the processor may perform optimization on the extracted features only.

In operation 1207, the processor of the electronic device according to an example embodiment may generate an AR image through information about the surrounding map and the pose of the electronic device estimated in operation 1206, and display the generated AR image through the display, thereby providing a user with the AR image.

In other words, the electronic device according to an example embodiment may adjust the number of features according to the computing budget of the processor and the registration error of the extracted features through the above-described operations 201 to 1205, and accordingly the occurrence of latency may be prevented and the registration error performance may be maintained or improved.

Figure 13:
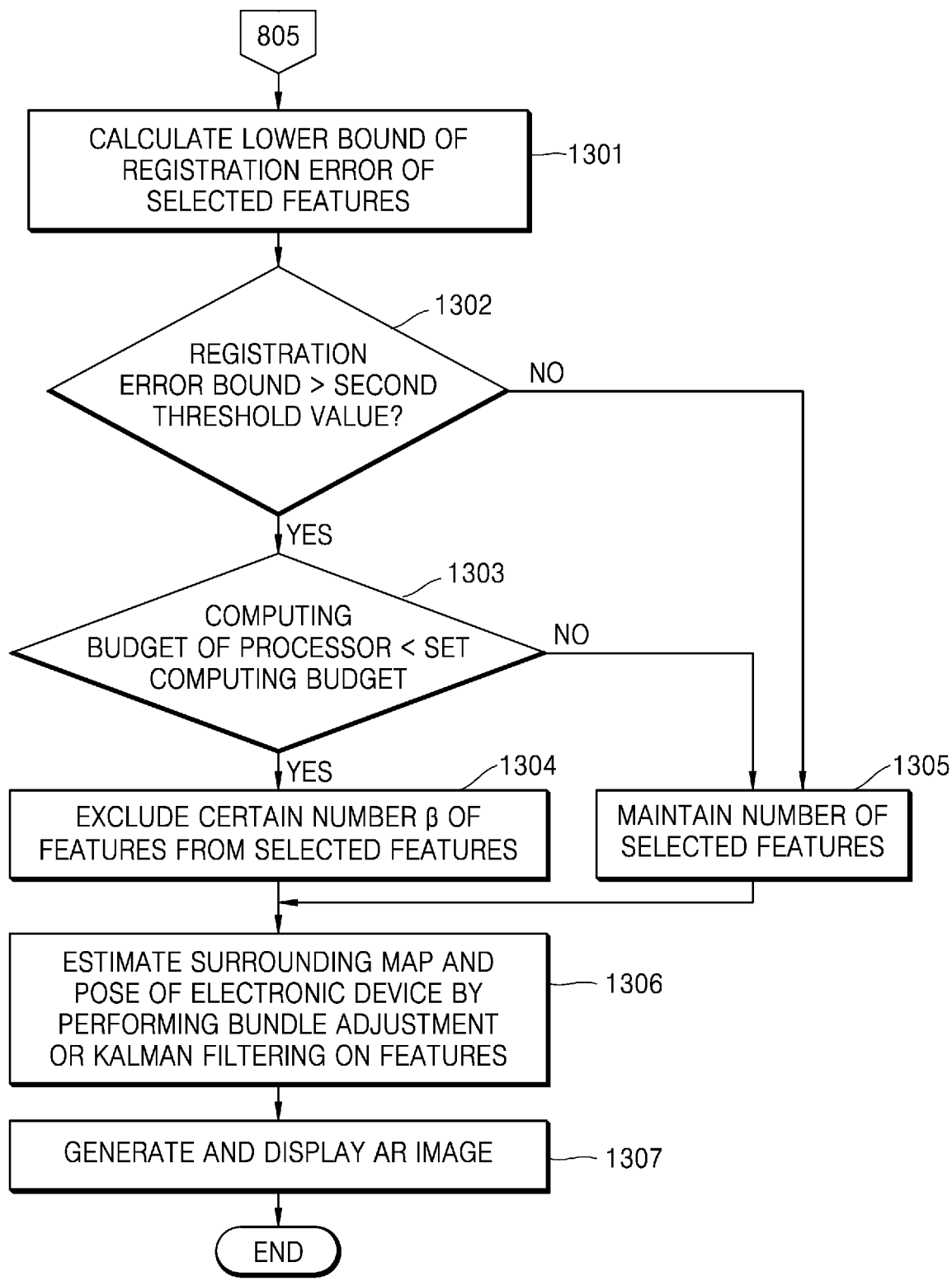
FIG. 13 is a flowchart of a method of decreasing the number of features in an electronic device according to another example embodiment.

FIG. 13 is a flowchart of a method of decreasing the number of features in an electronic device according to another example embodiment. FIG. 13 shows a method of removing or excluding some of the selected features after operation 805 of FIG. 8.

Referring to FIG. 13, in operation 1301, a processor, for example, the processor 120 of FIG. 3, of an electronic device according to another example embodiment, for example, the electronic device 100 of FIGS. 1 to 3, may calculate a lower bound of a registration error of features selected through operation 805 of FIG. 8. As operation 1301 is substantially the same as or similar to operation 1201 of FIG. 12, a redundant description thereof is omitted.

In operation 1302, the processor of the electronic device according to another example embodiment may determine whether the lower bound of the registration error calculated in operation 1301 is less than a second threshold value stored in a memory, for example, the memory 130 of FIG. 3.

In the disclosure, the "second threshold value" may mean a lower threshold value of a registration error set to reduce the registration error, and the second threshold value may be less than the first threshold value. For example, when the lower bound of the registration error is less than the second threshold value, the registration error of a desired level performance may be secured even when some of the extracted features is removed or excluded.

In operation 1302, when the lower bound of the registration error is determined to be less than the second threshold value, in operation 1303, the processor of the electronic device according to another example embodiment may be determined whether the computing budget of the processor is greater than the set computing budget stored in the memory.

For example, when the lower bound of the registration error is less than the second threshold value, the processor may determine that it is a situation in which the registration error of a desired level may be secured even when some features are removed from among the extracted features, and compare the computing budget of the processor with the set computing budget to determine whether a situation where latency may occur.

In contrast, in operation 1302, when the lower bound of the registration error is greater than the second threshold value, the processor of the electronic device according to another example embodiment may determine that it is a situation in which the registration error of a desired level may not be secured even when some features are removed or excluded from among the extracted features, the number of selected features may be maintained through operation 1305.

In operation 1303, when the computing budget of the processor is determined to be greater than the set computing budget, in operation 1304, the processor of the electronic device according to another example embodiment may reduce the number of featured by removing a certain number β of features from among the extracted features.

When the computing budget of the processor is greater than the set computing budget, latency may occur in the process of performing optimization on the extracted features. For example, when the required computing resources of the processor is greater than the set computing resources, latency may occur in the process of performing optimization on the extracted features. Accordingly, when the lower bound of the registration error is less than the second threshold value, and the computing budget of the processor is greater than the set computing budget, the processor may prevent the occurrence of latency while securing the registration error of a desired level, by reducing the number of features.

In contrast, in operation 1303, when the computing budget of the processor is determined to be less than or equal to the set computing budget, in operation 1305, the processor of the electronic device according to another example embodiment may determine that it is a situation in which latency may not be highly likely to occur, and maintain the number of selected features.

In operation 1306, the processor of the electronic device according to another example embodiment may estimate the surrounding map and the current pose of the electronic device by performing the bundle adjustment or Kalman filtering on the features.

According to an example embodiment, the processor may estimate information about a surrounding map of the electronic device and 6 degrees of freedom pose of the electronic device, by performing the bundle adjustment or Kalman filtering on the features extracted from surrounding objects and/or the features having a number adjusted through operation 1304.

For example, when the lower bound of the registration error is less than the second threshold value, and the computing budget of the processor is greater than the set computing budget, the processor may perform optimization on some of the extracted features where the certain number β of features are removed. In another example, when the lower bound of the registration error is greater than the second threshold value, or the computing budget of the processor is less than or equal to the set computing budget, the processor may perform optimization on the extracted features.

In operation 1307, the processor of the electronic device according to another example embodiment may generate an AR image through information about the surrounding map and the pose of the electronic device estimated in operation 1306, and display the generated AR image through the display, thereby providing a user with the AR image.

In other words, the electronic device according to another example embodiment may adjust the number of features according to the registration error of the extracted features and the computing budget of the processor, through the above-described operations 1301 to 1305, and accordingly prevent the occurrence of latency and maintain or improve the registration error performance.

The above-described operation methods of FIGS. 5, 8, 9, and 11 to 13 may be recorded on a computer-readable recording medium having recorded thereon one or more programs including instructions for executing the methods. The computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes created by a compiler, but also high-level programming language executable by a computer using an interpreter.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

What is claimed is:

1. A simultaneous localization and mapping (SLAM)-based electronic device comprising:
   an data acquisition device configured to acquire external data;
   a memory configured to store a reference number; and
   a processor configured to be operatively connected to the data acquisition device and the memory,
   wherein the processor is configured to:
      extract features of surrounding objects from the acquired external data;
      calculate a score of a registration error of the extracted features based on a number of the extracted features being greater than the reference number stored in the memory; and
      select a number of features from among the extracted features based on the calculated score, the number of the selected features being equal to the reference number.

2. The SLAM-based electronic device of claim 1,
   wherein the processor is further configured to:
      based on an error between a pose of the surrounding objects in a world coordinate system and a pose of the surrounding objects in a display coordinate system, generate an information matrix of the registration error of the extracted features, the display coordinate system set with respect to a display of the electronic device; and
      calculate the score of the registration error of the extracted features through the generated information matrix.

3. The SLAM-based electronic device of claim 2,
   wherein the processor is further configured to:
      receive information about a position of the surrounding objects from an external device that estimates the position of the surrounding objects; and
      generate the information matrix of the registration error of the extracted features, based on the received information about the position of the surrounding objects.

4. The SLAM-based electronic device of claim 2,
   wherein the processor is further configured to:
      generate information about a position of the surrounding objects by assuming the position of the surrounding objects in the display coordinate system; and
      generate the information matrix of the registration error of the extracted features, based on the generated information about the position of the surrounding objects.

5. The SLAM-based electronic device of claim 1,
   wherein the processor is further configured to select the features from among the extracted features, based on the calculated score, an amount of change in intensity of the extracted features, and a tracking frequency.

6. The SLAM-based electronic device of claim 2,
   wherein the processor is further configured to calculate a lower bound of the registration error of the selected features, based on the generated information matrix.

7. The SLAM-based electronic device of claim 6, wherein the processor is further configured to select additional features from among the extracted features, based on a determination that the calculated lower bound is greater than a first threshold value stored in the memory, and a computing budget of the processor is less than a reference computing budget stored in the memory.

8. The SLAM-based electronic device of claim 6, wherein the processor is further configured to exclude one or more features from the selected features, based on a determination that the calculated lower bound is less than a second threshold value stored in the memory, and a computing budget of the processor is greater than a reference computing budget stored in the memory.

9. The SLAM-based electronic device of claim 1, wherein the data acquisition device comprises:
a camera configured to acquire image data of the surrounding objects; and
an inertia measurement unit (IMU) configured to acquire inertia data corresponding to movement of the electronic device.

10. The SLAM-based electronic device of claim 1, wherein the processor is configured to estimate a pose and a surrounding map of the electronic device, by performing bundle adjustment or Kalman filtering on the selected features.

11. The SLAM-based electronic device of claim 10, wherein the processor is further configured to:
generate an augmented reality image, based on the acquired external data and the estimated pose and surrounding map; and
display the generated augmented reality image through the display.

12. An operating method of a simultaneous localization and mapping (SLAM)-based electronic device, the method comprising:
acquiring external data from through a data acquisition device;
extracting features of an object surrounding the electronic device, from the acquired external data;
calculating a score of a registration error of the extracted features based on a number of the extracted features being greater than a reference number; and
selecting a number of features from among the extracted features, based on the calculated score, the number of the selected features being equal to the reference number.

13. The method of claim 12, wherein the acquiring of the external data comprises:
acquiring image data of the surrounding object through a camera; and
acquiring inertia data corresponding to movement of the electronic device, through an inertia measurement unit (IMU).

14. The method of claim 12, wherein the calculating of the score of the registration error comprises:
based on an error between a pose of the surrounding object in a world coordinate system and a pose of the surrounding object in a display coordinate system, generating an information matrix of the registration error of the extracted features, the display coordinate system set with respect to a display of the electronic device; and
calculate the score of the registration error of the extracted features through the generated information matrix.

15. The method of claim 14, wherein the generating of the information matrix comprises:
receiving information about a position of the surrounding object from an external device for estimating the position of the surrounding object; and
generating the information matrix of the registration error of the extracted features, based on the received information about the position of the surrounding object.

16. The method of claim 14, wherein the generating of the information matrix comprises:
generating information about a position of the surrounding object by assuming the position of the surrounding object in the display coordinate system; and
generating the information matrix of the registration error of the extracted features, based on the generated information about the position of the surrounding object.

17. The method of claim 12, wherein the selecting of the features comprises selecting the number of the features from among the extracted features, based on the calculated score, an amount of change in intensity of the extracted features, and a tracking frequency.

18. The method of claim 14, further comprising calculating a lower bound of the registration error of the selected features, based on the generated information matrix.

19. The method of claim 18, further comprising:
comparing a computing budget of a processor with a reference computing budget, based on the calculated lower bound being greater than a first threshold value; and
selecting additional features from among the extracted features, based on a determination that the computing budget of the processor is less than the reference computing budget.

20. The method of claim 18, further comprising:
comparing a computing budget of a processor with a reference computing budget, based on the calculated lower bound being less than a second threshold value; and
excluding a certain number of features from among the extracted features, based on a determination that the computing budget of the processor is greater than the reference computing budget.

* * * * *